United States Patent [19]

Tindale

[11] Patent Number: 5,529,744

[45] Date of Patent: *Jun. 25, 1996

[54] METHOD FOR THE PRODUCTION OF POLYMER BOTTLES

[75] Inventor: Neil Tindale, Cleveland, England

[73] Assignee: Imperial Chemical Industries PLC, London, England

[ * ] Notice: The term of this patent shall not extend beyond the expirastion date of Pat. No. 5,409,983.

[21] Appl. No.: 384,643

[22] Filed: Feb. 6, 1995

Related U.S. Application Data

[62] Division of Ser. No. 88,097, Jul. 6, 1993, which is a continuation of Ser. No. 617,037, Nov. 23, 1990, abandoned.

[30] Foreign Application Priority Data

Nov. 24, 1989 [GB] England .................. 8926631

[51] Int. Cl.$^6$ .................. B29C 49/06; B29C 49/64
[52] U.S. Cl. .................. 264/532; 264/458; 264/535; 264/537; 264/328.18
[58] Field of Search .................. 264/25, 523, 535, 264/521, 537, 454, 458, 492, 328.18; 524/409, 410, 415, 417, 431, 439, 440; 428/35.3, 35.8, 542.8

[56] References Cited

U.S. PATENT DOCUMENTS

| | | |
|---|---|---|
| 3,264,255 | 8/1966 | Taylor . |
| 3,492,151 | 1/1970 | Cescon .................. 117/93 |
| 3,951,905 | 4/1976 | Sano et al. .................. 524/410 |
| 4,250,078 | 2/1981 | McFarlane et al. .................. 264/26 |
| 4,476,272 | 10/1984 | Pengilly .................. 524/417 |
| 4,545,926 | 10/1985 | Fout et al. .................. 252/511 |
| 4,582,872 | 4/1986 | Hodgon et al. .................. 524/939 |
| 4,604,257 | 8/1986 | Smith et al. .................. 264/513 |
| 4,684,686 | 8/1987 | Hepp .................. 564/281 |
| 4,772,656 | 9/1988 | Tanner .................. 524/441 |
| 4,778,820 | 10/1988 | Minnick .................. 524/439 |
| 4,822,665 | 4/1989 | Scholtz et al. .................. 428/222 |
| 4,871,790 | 10/1989 | Lamanna et al. .................. 524/333 |
| 4,895,904 | 1/1990 | Allingham .................. 524/431 |
| 5,409,983 | 4/1995 | Jones et al. .................. 524/439 |

FOREIGN PATENT DOCUMENTS

| | | |
|---|---|---|
| 1293952 | 4/1962 | European Pat. Off. . |
| 0041035 | 12/1981 | European Pat. Off. . |
| 0102913 | 3/1984 | European Pat. Off. . |
| 185355 | 7/1989 | Japan . |
| 0751751 | 7/1956 | United Kingdom . |
| 1058387 | 2/1967 | United Kingdom . |

*Primary Examiner*—Catherine Timm
*Attorney, Agent, or Firm*—Cushman Darby & Cushman

[57] ABSTRACT

Bottle preforms are made by injection moulding a thermoplastic polymer, preferably a polyethylene terephthalate polymer, which contains metal particles, preferably particles of antimony, which are sufficiently fine for them not to be visible to the eye and which intrinsically absorb radiation in the wavelength region 500 nm to 2000 nm. The metal particles are present in an amount such that the reheat time of the polymer is less than the reheat time of the polymer in the absence of the metal particles. The metal particles contained in the polymer are generated in situ by incorporating into the polymer fine particles of a reducible metal compound and a reducing agent capable of reducing the metal compound to the metal and then reacting the metal compound with the reducing agent so as to produce the metal particles. Bottles are made from the bottle preforms by reheating the bottle preforms and then blow moulding bottles from the reheated preforms.

9 Claims, No Drawings

5,529,744

METHOD FOR THE PRODUCTION OF POLYMER BOTTLES

This is a division of application Ser. No. 08/088,097, filed Jul. 6, 1993 which is a continuation of Ser. No. 07/617,037 filed Nov. 23, 1990, now abandoned.

This invention relates to packaging material, particularly bottles made from particular polymer compositions, particularly polyester polymer compositions.

The use of polyester compositions, particularly compositions comprising polyethylene terephthalate or copolymers thereof (hereinafter collectively referred to as "PET"), for example in the form of films, bottles and other containers, as a packaging material is well known. When the bottles or other containers (hereinafter referred to as "bottles") are for use in containing pressurised fluids such as carbonated drinks, the compositions, in the form of polymer chip, are usually formed into the bottle shape in a two stage process. Firstly, a bottle preform is injection moulded; and, secondly, either immediately or after a short storage period, the bottle preform is blown using compressed air into a mould which is the final shape of the bottle. The blow moulding step causes biaxial orientation of the composition to occur at least in selected regions of the bottle whereby the bottle resists deformation from internal pressure during use. In the second stage of the process, the preform is usually at ambient temperature and it has to be heated to about 100° C. for the blow moulding step. It is this "reheat" step which is usually the rate determining step in the second stage of the process.

Many of the commercial heaters used in the reheat step are quartz infra-red lamps which emit most intensely in the wavelength region 500 nm to 2000 nm. The intrinsic absorption of PET is low for electromagnetic radiation in that region. Any absorption observed in the material is usually as a result of suspended foreign matter, e.g. catalyst residues and impurities, and the absorption is a combination of light scattering by the suspended matter and any intrinsic absorption the suspended matter may display. Thus, the rate of reheat of PET compositions is very dependent upon how clean the composition is and dirty compositions, which have a relatively high haze level owing to the presence of contaminants, reheat quicker than clean compositions. For some applications, compositions may include pigments to colour the composition, e.g. green or brown, which materially contributes to lowering the reheat time of those compositions. However, for many applications, uncoloured i.e. unpigmented and undyed, compositions having a minimal haze are required. In those circumstances, the level of contaminants required to produce a significant reduction of the reheat time of the composition results in a composition having an unacceptable haze level.

The Applicants have found that the reheat times of polymer compositions, particularly polyester compositions, which include small amounts of fine metal particles are surprisingly and significantly reduced whilst retaining an acceptable haze level.

The present invention accordingly provides packaging material which comprises a polymer which contains metal particles, which intrinsically absorb radiation in the wavelength region 500 nm to 2000 nm, in a quantity such that the reheat time of the polymer is less than the reheat time of the polymer in the absence of that quantity of particles.

The packaging material of the invention can particularly take the form of bottles such as blow moulded bottles particularly injection blow moulded bottles especially injection stretch blow moulded bottles. The invention includes the preforms from which such bottles can be made, particularly injection moulded bottle preforms.

The invention also provides a method of making a thermoplastic polymer composition comprising a polymer which contains metal particles, which intrinsically absorb radiation in the wavelength region 500 nm to 2000 nm, in a quantity such that the reheat time of the polymer is less than the reheat time of the polymer in the absence of that quantity of particles which method comprises blending a polymer with fine particles of a reducible metal compound and with a reducing agent capable of reducing the compound to the metal and reacting the metal compound with the reducing agent to generate the fine particles of metal.

The method of the invention can be applied to make packaging material, particularly injection blow moulded, especially injection stretch blow moulded, bottles and injection moulded bottle preforms which can be used in their manufacture. In these methods the packaging material is made from the composition including the metal particles. The manufacture of blow moulded bottles by these methods will typically include the step of preheating an injection moulded bottle preform made from the polymer composition containing the metal particles.

The thermoplastic polymer used in the invention is most usually a polyester, particularly a partially aromatic polyester, especially a polyester derived, at least mainly, from an aromatic diacid and an aliphatic (including cycloaliphatic) diol. A preferred partially aromatic polyester is one which comprises at least 50 mole %, preferably at least 70 mole %, of ethylene terephthalate residues. The polyester may also contain residues derived from ethylene isophthalate, ethylene naphthalate, ethoxyethylene terephthalate, ethoxyethylene isophthalate or ethoxyethylene naphthalate.

Suitable metals include antimony, tin, copper, silver, gold, arsenic, cadmium, mercury, lead, palladium and platinum or a mixtures of two or more of these. For most applications, the metals silver, gold, arsenic, cadmium, mercury, lead, palladium and platinum are either too expensive or environmentally hazardous and these metals are, consequently, not particularly preferred. Desirably, the metal is one or more of antimony, tin or copper with antimony being particularly advantageous.

The metal particles are preferably sufficiently fine for them not to be visible to the eye and have a range of sizes such that absorption of radiation occurs over a relatively wide part of the wavelength range and not just at one particular wavelength or over a narrow band.

It is possible to add the metal particles to the polymer as finely divided metal particles. However, we have found that it is particularly advantageous to provide the metal in the polymer in a reducible form, and particularly as fine particles of the metal compound, and to include a suitable reducing agent in the polymer. Reaction e.g. during processing of the polymer, between the metal compound and the reducing agent leads to formation of the metal distributed through the polymer. Especially where the polymer is a polyethylene terephthalate polymer (or copolymer) it is advantageous to incorporate the reducible metal compound and the reducing agent in the polymer during synthesis of the polymer. As is mentioned below this works particularly well where the metal is antimony.

The amount of metal particles present in the composition as it is to be used is a balance between the desired reduction in the reheat time of the polymer and the amount of haze that is acceptable for a given application. Conveniently, the amount of metal particles is between 3 ppm and 300 ppm (ppm=parts per million by weight) more particularly between 5 ppm and 150 ppm, and especially between 10 ppm and 100 ppm. If desired, masterbatches of the polymer composition containing quantities of metal particles in far higher concentrations can be made for subsequent blending with polymer essentially free from the metal particles to achieve the desired levels of particles.

When a reducible metal compound is used, the quantity of reducing agent to be used is readily determinable by stoichiometric calculation and subsequent experimentation. In some polymer systems, it may be necessary to add more than the stoichiometric amount, e.g. to allow for loses, scavenging effects such as interaction of the reducing agent with oxygen dissolved in the polymer etc. Suitable reducing agents include phosphorus (III) compounds such as phosphorous acid or triphenyl phosphite.

In polyester compositions, antimony is especially preferred as, in the form of antimony trioxide (antimony (III) oxide), it is a catalyst for the polymerisation of the monomers used in the preparation of polyesters such as polyethylene terephthalate. As the polyester monomer melt is a slightly reducing environment the polyesters may naturally have a very minor proportion of antimony metal present, e.g. 1 ppm to 2 ppm. However, those low levels of antimony metal do not affect the reheat time significantly. It is necessary to increase the amount of antimony metal present in the polymer to a quantity more than these background levels.

The polymer composition used in the invention can also contain other additives and/or lubricants such as catalysts, stabilisers, processing aids, antioxidants, fillers, plasticisers and nucleating agents as is well known in the art.

Typically, polyesters such as polyethylene terephthalate polymer (PET) are made by reacting a glycol with a dicarboxylic acid as the free acid or its dimethyl ester to produce a prepolymer compound which is then polycondensed to produce the polyester. If required, the molecular weight of the polyester can then be increased further by solid state polymerisation.

The invention includes packaging material made from a thermoplastic polyester composition according to the invention The invention is illustrated by the following Examples. All parts and percentages are by weight unless otherwise specified.

Test Methods

Haze of the polymer compositions was determined using standard size plaques of the composition and a Gardener Haze meter.

Luminance and yellowness of the polymer compositions were determined using a digital colour monitor (which is a tristimulus filter colourimeter designed such that the intensity of the reflected light in three wavelength regions of the visible spectrum can be quantitatively measured) available from Instrumental Colour Systems, Newbury, Berkshire, GB.

Reheat time of the polymer compositions was assessed by exposing a preform at ambient temperature (21° C.) to heat for 45 seconds, allowing the preform to equilibrate for 20 seconds and then measuring the temperature of the inner surface of the preform. The heating of the preform took place in a Krupp Corpoplast LB01 stretch blow moulding machine which has infra-red quartz element heaters. The preform is mounted on a rotating stand in the machine to ensure uniform heating of the preform. The temperature of the inner surface was determined using a thermocouple mounted such that its tip was held in contact with the inner surface.

EXAMPLE 1

Molten polyethylene terephthalate prepolymer (70 kg) at a temperature of 260°±5° C. was placed in a steel autoclave, equipped with a heating jacket, agitator, condenser and a pressure/vacuum connection, together with a solution of phosphoric acid (21.0 g, 300 ppm), phosphorous acid (280 g, 40 ppm) and ethylene glycol (500 ml). After 10 minutes, a slurry of antimony trioxide (17.5 g, 250 ppm) in ethylene glycol (500 ml) was added to the autoclave. The pressure in the autoclave was then reduced to <1 mbar over a period of 30 minutes. Polymerisation then proceeded with removal of ethylene glycol. After the required melt viscosity had been reached (corresponding to an intrinsic viscosity (IV) of approximately 0.6 dl.g$^{-1}$), the pressure was raised to approximately 2 bara using an atmosphere of nitrogen. The polymer was then cast, quenched in water and cut into chips. The resulting amorphous polymer chips were tested for colour and luminance as described above.

The polymer chips were then subjected to solid phase polymerisation by heating the chips to about 215° C. under a nitrogen flow (preheated to about 215° C.) of 30 l.min$^{-1}$ until the IV of the polymer had increased to approximately 0.8 dl.g$^{-1}$.

A proportion of the resultant polymer composition (Sample 6) was moulded into plaques 4 mm thick and preforms by drying and then injection moulding, for use in determining haze and reheat rate for comparison with conventional polyethylene terephthalate (Sample 1). The preforms were made using a 55 g preform mould and a Negri Bossi NB90 injection moulding machine. The results of these tests and of the tests of the samples produced in accordance with Examples 2 to 5 are summarised in Table 1 below.

EXAMPLE 2

Example 1 was repeated five times but using 10, 15, 20, 30 and 80 ppm of phosphorous acid, respectively, to produce Samples 2 to 5 and 7.

EXAMPLE 3

A portion of Sample 7 was blended in a ratio of 1:1 by weight with a sample of conventional polyethylene terephthalate before producing the test pieces (Sample 8).

EXAMPLE 4

Example 1 was repeated but using 21 g (300 ppm on the final product) of phosphorous acid and 35 g (500 ppm on the final product) of antimony trioxide (Sample 9).

EXAMPLE 5

A portion of Sample 9 was blended in a ratio of 1:10 by weight with a sample of conventional polyethylene terephthalate before producing the test pieces (Sample 10).

EXAMPLE 6

Example 1 was repeated except that 70 g of triphenylphosphite (1000 ppm on the final product) was substituted for the phosphorous acid (Sample 11).

EXAMPLE 7

Preforms of compositions 1 and 4 to 7 were blown on the Krupp machine (constant temperature, variable time) to determine the minimum exposure period required to successfully blow mould a bottle, i.e. to blow the bottle without inducing stress whitening owing to cold blowing. The results are listed in Table 2 below.

As can be seen from these Examples and the data in Tables 1 and 2, a significant improvement in reheat rate is achieved by the reduction of relatively small amounts of antimony trioxide to antimony without significant increases in haze, yellowness or luminance occurring in the polymer.

EXAMPLE 8

Example 1 was repeated except that, 10 minutes after the addition of the acid solution, a solution of 5.1 g copper (II) acetate monohydrate (73 ppm on the final product) in ethylene glycol (100 ml) was added to the autoclave, the antimony trioxide slurry only being added after a further 10 minutes. The resultant amorphous polymer had a slight orange colour indicating the presence of metallic copper. In the reheat rate test, the temperature of the inner surface of a preform made from this polymer was 114° C.

EXAMPLE 9

Example 1 was repeated except that antimony pentoxide was substituted for the antimony trioxide. In the reheat rate test, the temperature of the inner surface of a preform made from this polymer was 113° C.

TABLE 1

| SAMPLE NO | Sb(0) ppm | LEVEL OF P(III) COMPOUND ppm | P(III) COMPOUND | REHEAT TEMPERATURE °C. | YELLOW-NESS | LUMINANCE | HAZE |
| --- | --- | --- | --- | --- | --- | --- | --- |
| 1 | 0 | 0 | — | 110 | −5.2 | 36.5 | 2.2 |
| 2 | 9.9 | 10 | $H_3PO_3$ | 110 | −6.2 | 36.5 | 2.3 |
| 3 | 14.8 | 15 | $H_3PO_3$ | 111 | −6.3 | 36.0 | — |
| 4 | 19.8 | 20 | $H_3PO_3$ | 112 | −6.6 | 35.0 | 3.6 |
| 5 | 29.7 | 30 | $H_3PO_3$ | 114 | −6.8 | 34.3 | 4.9 |
| 6 | 39.6 | 40 | $H_3PO_3$ | 116 | −7.4 | 33.0 | 5.5 |
| 7 | 79.2 | 80 | $H_3PO_3$ | 120 | — | — | — |
| 8 | 39.6 | 40 | $H_3PO_3$ | 115.5 | — | — | — |
| 9 | 296.9 | 300 | $H_3PO_3$ | 140 | — | — | — |
| 10 | 29.7 | 30 | $H_3PO_3$ | 114 | — | — | — |
| 11 | 261.8 | 1000 | $(PhO)_3P$ | 135 | — | — | — |

Notes:
1 Ph = phenyl
2 Sb(0) content was estimated from the amount of P(III) compound and Sb(III) compound used.

TABLE 2

| LEVEL OF P(III) COMPOUND (ppm) | MINIMUM PROCESSING TIME (seconds) |
| --- | --- |
| 0 | 60 |
| 20 | 52 |
| 30 | 48 |
| 40 | 45 |
| 80 | 42 |

I claim:

1. A method of making a bottle preform from a polymer composition comprising a thermoplastic polymer which contains metal particles which are sufficiently fine for them not to be visible to the eye and which intrinsically absorb radiation in the wavelength region 500 nm to 2000 nm, the particles being present in an amount of from 10 to 300 ppm based on the weight of the polymer such that the reheat time of the polymer is less than the reheat time of the polymer in the absence of the particles, which method comprises the steps of (1) incorporating into the thermoplastic polymer, fine particles of a reducible metal compound and a reducing agent capable of reducing the metal compound to the metal and reacting the metal compound with the reducing agent to generate said metal particles, and (2) injection moulding the bottle preform from the polymer composition.

2. A method of making a bottle preform from a polymer composition comprising a polyethylene terephthalate polymer which contains particles of metallic antimony which are sufficiently fine for them not to be visible to the eye and which intrinsically absorb radiation in the wavelength region 500 nm to 2000 nm, the particles of metallic antimony being present in an amount of from 10 to 100 ppm based on the weight of the polymer such that the reheat time of the polymer is less than the reheat time of the polymer in the absence of the particles, which method comprises the steps of (1) incorporating into the polyethylene terephthalate polymer, fine particles of a reducible antimony compound and a reducing agent capable of reducing the antimony compound to antimony and reacting the antimony compound with the reducing agent to generate said particles of metallic antimony, and (2) injection moulding the bottle preform from the polymer composition.

3. A method of making a bottle from a polymer composition comprising a thermoplastic polymer which contains metal particles which are sufficiently fine for them not to be visible to the eye and which intrinsically absorb radiation in the wavelength region 500 nm to 2000 nm, the particles being present in an amount of from 10 to 300 ppm based on the weight of the polymer such that the reheat time of the polymer is less than the reheat time of the polymer in the absence of the particles, which method comprises the steps of (1) incorporating into the thermoplastic polymer, fine particles of a reducible metal compound and a reducing agent capable of reducing the metal compound to metal and reacting the metal compound with the reducing agent to generate said metal particles, and (2) injection moulding a bottle preform from the polymer composition, and (3) subjecting the bottle preform to reheating and blow moulding a bottle from the reheated preform.

4. A method of making a bottle from a polymer composition comprising a polyethylene terephthalate polymer which contains particles of metallic antimony which are sufficiently fine for them not to be visible to the eye and which intrinsically absorb radiation in the wavelength region 500 nm to 2000 nm, the particles of metallic antimony being present in an amount of from 10 to 100 ppm based on the weight of the polymer such that the reheat time of the polymer is less than the reheat time of the polymer in the absence of the particles, which method comprises the steps of (1) incorporating into the polyethylene terephthalate polymer, fine particles of a reducible antimony compound and a reducing agent capable of reducing the antimony compound to antimony and reacting the antimony compound with the reducing agent to generate said particles of metallic antimony, and (2) injection moulding the bottle preform from the polymer composition, and (3) subjecting the bottle preform to reheating and blow moulding a bottle from the reheated preform.

5. A method as claimed in claim 1 or 3, wherein the particles of the reducible metal compound and the reducing agent are incorporated into the polymer as part of the synthesis of the polymer and wherein at least part of the reaction to form the metal particles takes place concurrently with the synthesis of the polymer.

6. A method as claimed in claim 2 or 4 wherein the particles of the reducible antimony compound and the reducing agent are incorporated into the polymer as part of the synthesis of the polymer and wherein at least part of the reaction to form the particles of metallic antimony takes place concurrently with the synthesis of the polymer.

7. A method as claimed in claim 2 or claim 4, wherein the polyethylene terephthalate polymer is a polyester which comprises at least 70 mole % of ethylene terephthalate residues and optionally further comprises residues derived from ethylene isophthalate, ethylene naphthalate, ethoxyethylene terephthalate, ethoxyethylene isophthalate or ethoxyethylene naphthalate.

8. A method as claimed in claim 7, wherein the reducible antimony compound is antimony (III) oxide and the reducing agent is a phosphorus (III) compound.

9. A method as claimed in claim 3 or claim 4 which additionally includes the step of stretching the preform prior to or simultaneously with the blowing of the bottle.

* * * * *